(12) United States Patent
Braunschädel

(10) Patent No.: US 6,581,964 B2
(45) Date of Patent: Jun. 24, 2003

(54) GAS BAG MODULE

(75) Inventor: Axel Braunschädel, Goldbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/861,225

(22) Filed: May 18, 2001

(65) Prior Publication Data

US 2002/0030355 A1 Mar. 14, 2002

(30) Foreign Application Priority Data

May 19, 2000 (DE) .................................... 200 08 916 U
Dec. 20, 2000 (DE) .................................... 200 21 533 U

(51) Int. Cl.$^7$ ............................................. B60R 21/16
(52) U.S. Cl. ..................... 280/743.2; 280/733; 280/735
(58) Field of Search ........................... 280/728.2, 730.1, 280/331, 733, 735, 743.2

(56) References Cited

U.S. PATENT DOCUMENTS

| | | | | |
|---|---|---|---|---|
| 5,362,101 A | * | 11/1994 | Sugiura et al. | ........... 280/728.2 |
| 5,489,119 A | * | 2/1996 | Prescaro et al. | ......... 280/730.1 |
| 5,678,858 A | * | 10/1997 | Nakayama et al. | ....... 280/728.2 |
| 5,762,367 A | * | 6/1998 | Wolanin | ...................... 280/736 |
| 5,887,894 A | * | 3/1999 | Castagner et al. | ........... 280/735 |
| 5,945,184 A | * | 8/1999 | Nagata et al. | ............ 280/728.1 |
| 6,254,130 B1 | * | 7/2001 | Jayaraman et al. | ......... 280/731 |
| 6,290,257 B1 | | 9/2001 | Bunce et al. | |
| 6,315,323 B1 | | 11/2001 | Pack, Jr. | |
| 6,334,627 B1 | * | 1/2002 | Heym et al. | .............. 280/728.1 |
| 6,361,072 B1 | * | 3/2002 | Barnes | ..................... 280/728.1 |

FOREIGN PATENT DOCUMENTS

| | | | | |
|---|---|---|---|---|
| JP | 2-37060 | * | 2/1990 | .............. 280/743.2 |
| JP | 3-136946 | * | 6/1991 | .............. 280/743.2 |
| JP | 533427 | | 8/1993 | |

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

The invention relates to a gas bag module comprising a gas bag which has, with respect to its inflated sate, a front wall including a middle portion. The middle portion features a depression in an inflated state of the gas bag, by a restraining means being provided which engages the middle portion and at least partly prevents the same from moving in a direction out of the gas bag module. The restraining means is formed such that it is able to release the middle portion after an initial restraint.

10 Claims, 2 Drawing Sheets

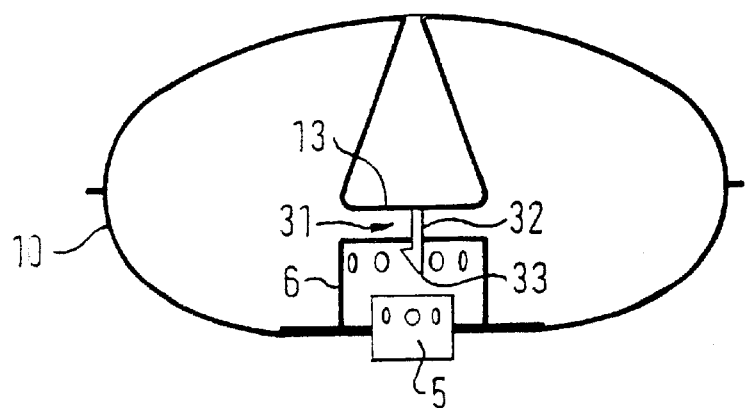
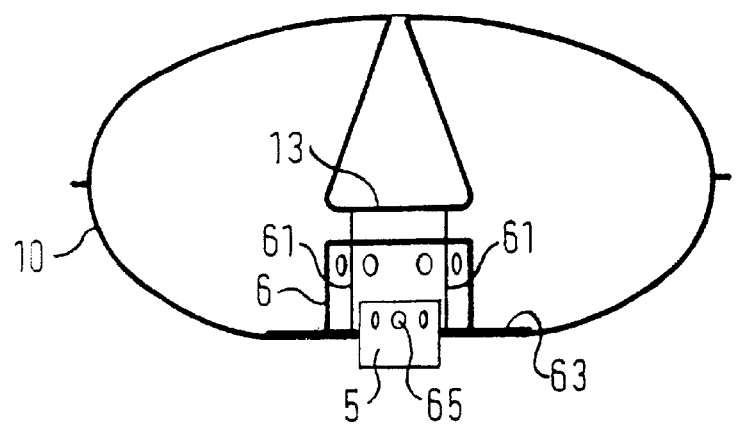

GAS BAG MODULE

TECHNICAL FIELD

This invention relates to a gas bag module comprising a gas bag.

BACKGROUND OF THE INVENTION

Gas bag modules with a so-called ring-shaped gas bag are already known from DE 36 30 685 A1. Here, the front wall is that wall of the gas bag which in the inflated state is directed towards the occupant and which the occupant can impact upon. The middle portion usually is the center of the front wall, which middle portion remains firmly attached to the gas bag module in the case of the known gas bag, so that in the inflated state the above-mentioned ring-shaped chamber is formed.

From DE 199 04 072 A1 there is likewise known a gas bag module with a ring-shaped gas bag, the middle portion of which is prevented from moving towards the occupant by a funnel-shaped part of the module cover. The funnel-shaped module cover is intended to define a deployment direction radially and obliquely outwards, so that occupants disposed clearly outside a central seating position (centrally with respect to the vehicle seat as seen in longitudinal direction of the vehicle) also experience a restraint. Even occupants seated too close to the steering wheel can not be contacted by the accelerated middle portion, which normally first gets in contact with the occupant, as the middle portion is permanently restrained. There is at best allowed a minor movement of the module cover out of the module towards the occupant (deployment direction), this movement being so small that the occupant cannot get in contact with the cover.

In the known gas bags, this middle portion is not available for restraint, not even in the case of heavy occupants, which are disposed in a central seating position and thus hit the front wall in the region of the depression.

BRIEF SUMMARY OF THE INVENTION

The invention provides a gas bag which restrains heavy and centrally seated occupants even more safely. This is achieved in a gas bag module comprising a gas bag which has, with respect to its inflated state, a front wall including a middle portion. The middle portion features a depression in an inflated state of the gas bag, by a restraining means being provided which engages the middle portion and at least partly prevents the same from moving in a direction directed out of the gas bag module. The restraining means is formed such that it is able to release the middle portion after an initial restraint. In the gas bag module proposed, the middle portion is initially restrained, so that the gas bag first of all radially moves radially and obliquely outwards. In this phase of the inflation process, the depression is formed. In the further course of the inflation process, however, the restraining means releases the middle portion, so that the same can move towards the occupant and the occupant can contact the middle portion, and thus can be restrained by the same. This release of the middle portion can be effected obligatorily in any case or depending on specific frame conditions, e.g. from a specific internal gas bag pressure onwards or depending on the position of the occupant. For instance, a heavy occupant or an occupant having an average weight would generate a high internal gas bag pressure in the case of a high impact intensity, when the occupant falls into the gas bag, which high internal gas bag pressure then results in the restraining means releasing the middle portion, and the latter can contribute to a restraint. Via position sensors, the seating position of the occupant can, for instance, be determined. If in the case of an impact the occupant is positioned too close to the gas bag module or off-center, the restraining means would possibly not release the middle portion at all, in order to achieve a better restraining effect and minimize the risk of the occupant being hurt by the air bag.

The restraining means can, for instance, selectively be destroyed or released during deployment, in order to release the middle portion. This destruction can be effected by the high internal pressure or, for instance, also by the influence of temperature due to the hot compressed gas.

In accordance with one embodiment, the restraining means has a limiting strap which is attached to the middle portion. This limiting strap for instance has a tear seam, which is destroyed for releasing the middle portion.

The use of a releasable latching connection as restraining means also is an inexpensive design.

In accordance with another embodiment, the restraining means has a drive for releasing the middle portion. This drive can be actuated by a control, which is coupled to a sensor, depending on the values detected by the sensor.

In accordance with a less expensive embodiment, the restraining means comprises a loop attached to the inside of the middle portion, and a retaining ring in which the loop is suspended. The loop or the retaining ring are destroyed from a specific physical load onwards.

BRIEF DESCRIPTION OF THE DRAWINGS

FIG. 4 shows a third embodiment of the gas bag module according to the invention, with the middle portion not yet released, and FIG. 5 shows a fourth embodiment of the gas bag module according to the invention, with the middle portion not yet released.

DETAILED DESCRIPTION OF THE PREFERRED EMBODIMENTS

Figure 1:
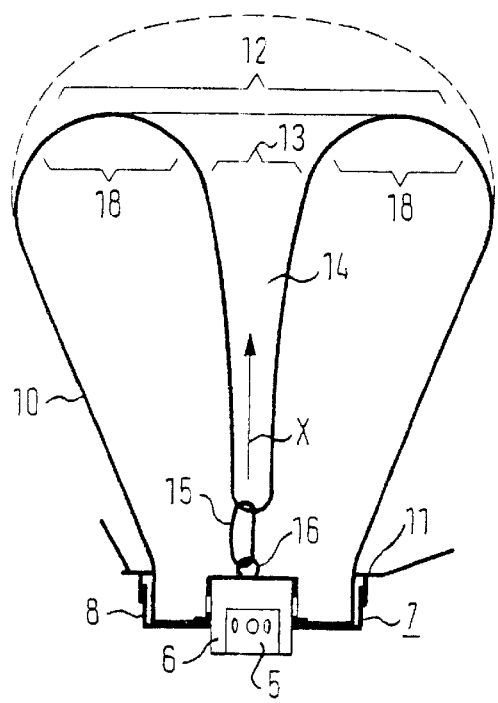
FIG. 1 shows a first embodiment of the gas bag module according to the invention, with the middle portion not yet released.
Figure 2:
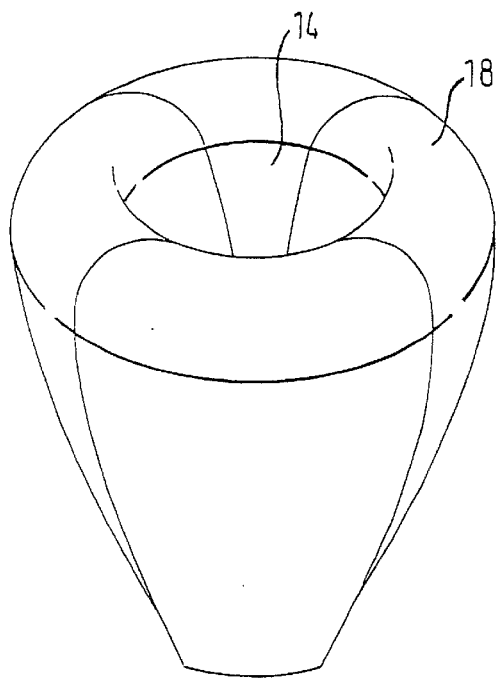
FIG. 2 shows a perspective top view of the gas bag shown in FIG. 1.

FIG. 1 represents a gas bag module which is accommodated in the steering wheel of a vehicle. The gas bag module has a gas generator 5 around which a holding member in the form of a diffuser 6 is arranged. Together with the gas generator 5, the diffuser 6 is in turn arrested at the housing 7 of the gas bag module. Between the diffuser 6 and the outer wall 8 of the housing 7, an annular space is formed, in which a gas bag 10 is accommodated in the folded state. A covering cap 11 seals the gas bag module in the non-deployed state of the gas bag and is swiveled outwards upon deployment. The gas bag consists of a gas bag wall, which has several portions, inter alia a portion referred to as front wall 12. The front wall 12 is that part of the gas bag which is facing the occupant in the inflated state of the gas bag. The front wall has a central portion, subsequently referred to as middle portion 13, which extends inwards towards the diffuser 6, i.e.

is directed into the interior of the gas bag, so that a depression 14 is obtained.

On the inside, a limiting strap 15 formed into a loop is attached to the middle portion 13, to be more precise at the lowest point of the middle portion in the inflated state as shown in FIG. 1. The loop is inserted in a retaining ring 16 which is attached to the diffuser 6.

In the state shown in FIG. 1, a large part of the gas generated by the gas generator 5 has already flown into the gas bag 10. The annular portion of the front wall 12, which is designated with the reference numeral 18, serves as restraining surface.

The loop in the form of the limiting strap 15 together with the retaining ring 16 form a restraining means for the middle portion.

The gas bag module functions as follows. As soon as an accident is detected, the gas generator 5 will make gas to flow out into the diffuser 6. The gas then arrives into the gas bag 10, and the same opens the cover 11, in order to reach the state shown in FIG. 1, in which the restraining means prevents the middle portion from moving in the direction X out of the module. In this context, direction X is that direction which is defined by the longitudinal extension of the depression 14 from the module to the outside. During normal use of the gas bag module, the direction extends from the module to the occupant.

Especially in the case of occupants disposed off-center with respect to the vehicle seat, the initial movement of the portion 18 directed obliquely outwards leads to a better restraint and a smaller load by the deploying gas bag. Even in the case of a centrally seated occupant, the chosen construction leads to small loads, as in conventional gas bags the middle portion 13 is accelerated most. Through reaching a predetermined internal gas bag pressure, the restraining means is selectively destroyed, however, so that the middle portion 13 with relation to FIG. 1 can move upwards, i.e. towards the occupant, in order to provide a larger restraining surface.

For instance at the end of the inflation process, the internal pressure becomes high enough due to the gas generator 5 still being active, to ensure that the restraining means is selectively destroyed, i.e. in a controlled manner, and the middle portion is released. Moreover, it is also possible to use the internal gas bag pressure for destroying the restraining means, which is produced by the impact of the occupant on the gas bag 10.

Upon release of the middle portion 13, the gas bag receives an outer shape represented in broken lines in the region of the front wall 12.

Figure 3:
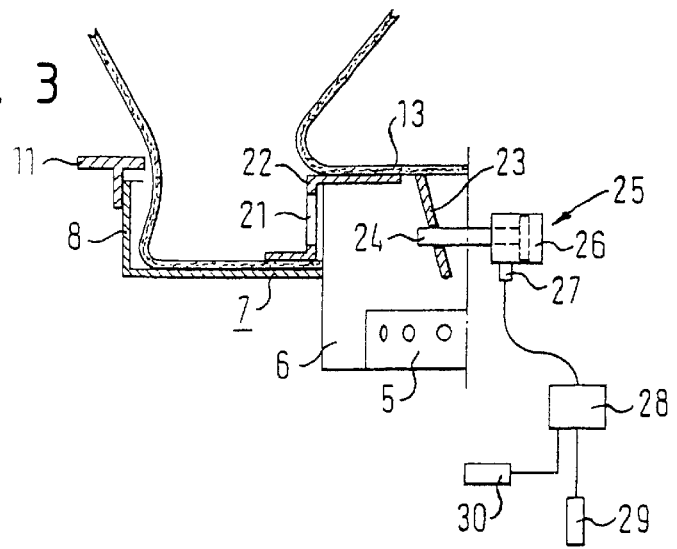
FIG. 3 shows an enlarged cross-sectional view of the gas bag module in the region of the module housing in accordance with a second embodiment.

In the embodiment as shown in FIG. 3 it can be seen that the gas flows from the diffuser 6 through openings 21 in a gas bag retaining metal sheet 22 into the gas bag. On its inside, the middle portion 13 has a limiting strap 23 with an opening through which a pin 24 extends as part of a drive 25. The pin 24 is the extension of a piston rod of a piston-cylinder unit 26, which can be put in motion by a pyrotechnical propellant charge 27. If necessary, the pyrotechnical propellant charge 27 is activated by a control 28 which is coupled with a plurality of sensors 29, 30. The sensors 29 are disposed in the passenger compartment and can detect the position of the vehicle occupant to be restrained by the gas bag 10. The sensors 30 are so-called crash sensors, which detect an accident and the severity of an accident.

In the embodiment represented in FIG. 3, the restraining means is formed by the drive 25 and the limiting strap 23.

In the case of restraint, the gas bag is first of all completely inflated with the middle portion 13 restrained. If the vehicle occupant is too close to the vehicle steering wheel or not centrally aligned on his vehicle seat, the drive 25 is not actuated at all and the gas bag retains the ring-shaped geometry.

However, if a severe accident has happened, for instance, or the occupant has an above-average weight, so that it must be avoided by all means that due to the depression 14 the available restraining surface is too small or the occupant penetrates too much into the gas bag 10 in the region of the depression 14, the drive 25 is actuated by the control 28. The gas flowing into the piston-cylinder unit 26 via the pyrotechnical drive 27 leads to the pin 24 being moved to the right, so that the pin 24 releases the limiting strap 23 and thus the middle portion 13 and the same is moved towards the occupant.

In the embodiment as shown in FIG. 4, a latching connection 31 is provided as restraining means, in that on the inside of the middle portion 13 a textile part 32 with a thickened end 33 is provided, the thickened end protruding through a centric opening in the diffuser 6. Upon reaching a specific internal pressure, the latching connection is released, so that the middle portion 13 can move towards the occupant.

Alternatively, a limiting strap attached to the middle portion 13 by means of tear seams could of course also be provided instead of the latching connection 31. The limiting strap would then permanently be attached directly to the diffuser 6. By reaching a specific internal pressure, the tear seam would be destroyed and release the middle portion 13.

In the embodiment as shown in FIG. 5, the middle portion 13 is connected with a base sheet 63 of the diffuser 6 via two limiting straps 61. The limiting straps 61 therefore protrude through the diffuser 6 and extend downwards in the vicinity of outflow openings 65 of the gas generator 5. In the first phase of deployment, the gas bag 10 assumes the shape as shown in FIG. 5, which shape is greatly determined by the restraining means in the form of the limiting straps 61. At the end of the deployment process, however, the limiting straps 61 are weakened—by the hot gas impinging on them—to such an extent that they tear and the middle portion 13 is released in a controlled manner for movement towards the occupant. In this embodiment, the restraining means is formed by the limiting straps 61.

What is claimed is:

1. A gas bag module comprising:
    a gas bag which has, with respect to its inflated state, a front wall including a middle portion, said middle portion featuring a depression in an inflated state of said gas bag, by a restraining means being provided which engages said middle portion and at least partly prevents said middle portion from moving in a direction out of said gas bag module,
    said restraining means releasing said middle portion after an initial restraint,
    said restraining means comprising a drive for releasing said middle portion,
    at least one sensor being provided as well as a control coupled with said at least one sensor, said drive being able to be actuated by said control dependent on values detected by said sensor.

2. The gas bag module as claimed in claim 1, wherein said sensor is a sensor which detects a position of said occupant to be restrained.

3. The gas bag module as claimed in claim 1, wherein said control is designed such that it actuates said drive for releasing said middle portion only when an occupant is disposed approximately in a central seating position.

4. The gas bag module as claimed in claim 1, wherein said restraining means comprises a loop attached to an inside of said middle portion and a retaining ring in which said loop is suspended, one of said loop and retaining ring being destroyed upon an initial restraint of said middle portion.

5. The gas bag module as claimed in claim 1, further comprising a gas generator and a holding member surrounding gas generator, said holding member being engaged by said restraining means.

6. The gas bag module as claimed in claim 1, wherein said restraining means is selectively destroyed or released during deployment of said gas bag, in order to release said middle portion.

7. The gas bag module as claimed in claim 6, wherein said restraining means has a limiting strap which is attached to said middle portion.

8. The gas bag module as claimed in claim 7, wherein said limiting strap has a tear seam which is destroyed for releasing said middle portion.

9. The gas bag module as claimed in claim 1, further comprising a gas generator, said restraining means being destroyed by hot gas from said gas generator.

10. The gas bag module as claimed in claim 1, wherein said restraining means comprises a latching connection which is released.

* * * * *